May 27, 1924.

H. TIETZ, JR

AUTO SPINDLE

Filed May 23, 1923

1,495,654

Herman Tietz, Jr.
INVENTOR

BY Victor J. Evans
ATTORNEY

WITNESS: Leo Hayes

Patented May 27, 1924.

1,495,654

UNITED STATES PATENT OFFICE.

HERMAN TIETZ, JR., OF ELY, NEVADA.

AUTO SPINDLE.

Application filed May 23, 1923. Serial No. 641,023.

*To all whom it may concern:*

Be it known that I, HERMAN TIETZ, Jr., a citizen of the United States, residing at Ely, in the county of White Pine and State of Nevada, have invented new and useful Improvements in Auto Spindles, of which the following is a specification.

This invention relates to auto spindles, and contemplates a structure designed to be used on either side of the car, so that it is only necessary to carry one of said spindles for an emergency, in contra-distinction to the usual practice of carrying as extra parts both a right and left hand spindle.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
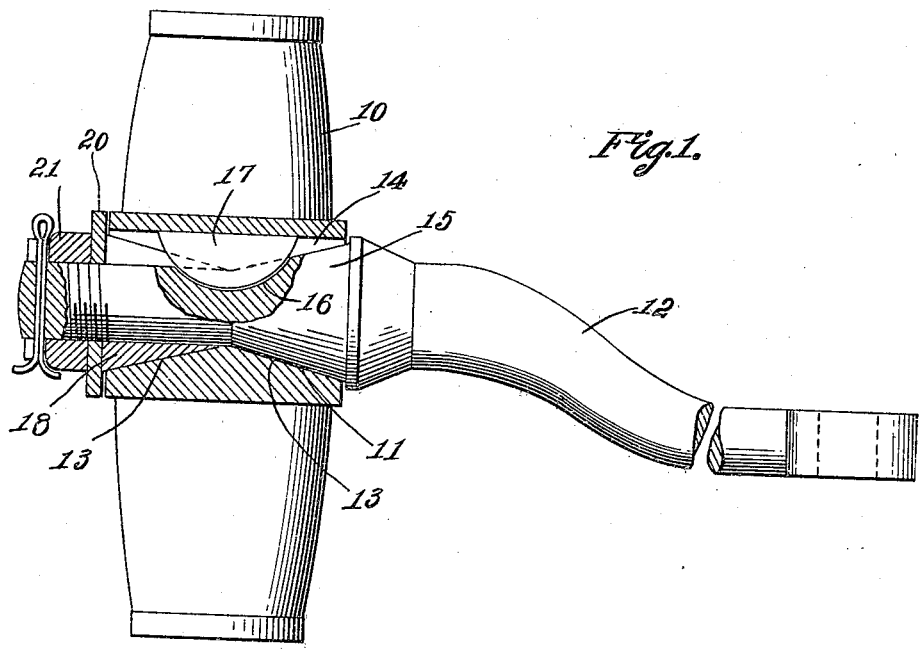
Figure 1 is a sectional view showing the manner of associating the spindle arm with the spindle in accordance with the present invention.
Figure 2:
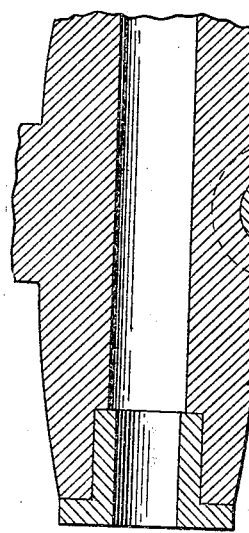
Figure 2 is a sectional view taken at right angles to Figure 1.
Figure 3:
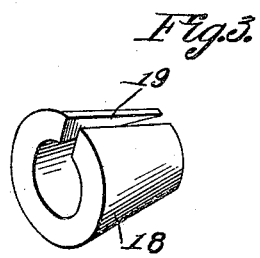
Figure 3 is a detail view of the bushing.

Referring to the drawing in detail 10 indicates the body of the spindle which is provided with the usual socket 11 for the reception of the spindle arm 12. In accordance with the present invention, the interior of the socket 11 is reversely tapered from its center toward the ends thereof as indicated at 12, and is further provided with a groove or key way 14. The spindle arm 12 is provided with a tapered portion 15 which when arranged within the socket is adapted to engage one of the tapered portions 13 thereof, the spindle arm being further provided with a curved recess 16 and arranged directly opposite the groove or key way 14. Prior to introducing the spindle arm into the socket, the said arm is equipped with a crescent shaped key 17, the latter being positioned in the recess 16, and when the arm is inserted into the socket, this key is received by the groove 14. The spindle arm projects through the socket, and is provided with a tapered bushing 18, the latter being arranged to contact the adjacent tapered surface 13 of the socket. The bushing is slotted as at 19 to accommodate the key 17, and is also provided with a flange 20 at one end. A nut 21 is threaded on the end of the spindle arm, and when tightened draws the arm in the socket and moves the bushing inwardly so that the parts can be associated to eliminate lost motion. The construction is such that by removing the steering arm, the tapered bushing can be subsequently removed and used at the opposite side of the car, inasmuch as the tapers are the same. Thus I have provided a reversible auto spindle susceptible of being used as a right or left hand spindle, so that it is only necessary to carry one of said spindles as an extra part for any emergency.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

A reversible spindle of the character described comprising a body portion having a socket for the reception of the spindle arm, said arm having a tapered portion and a curved recess, the interior of said socket being tapered in opposite directions from its center, one of said tapered portions being engaged by the taper of said arm, said socket having a groove arranged directly opposite said recess, a crescent shaped key fitted in the groove and recess, a tapered split bushing supported by the arm and arranged to engage the other tapered portion of the socket, a flange on said bushing, and a nut threaded on said arm and bearing against said flange for the purpose specified.

In testimony whereof I affix my signature

HERMAN TIETZ, JR.